United States Patent
Yang (10) Patent No.: US 8,305,361 B2
(45) Date of Patent: Nov. 6, 2012

(54) DEVICE AND METHOD FOR DETECTING POSITION OF OBJECT AND IMAGE DISPLAY SYSTEM HAVING SUCH DEVICE

(75) Inventor: Kai-Chieh Yang, Niaosong Township (TW)

(73) Assignee: Chimei Innolux Corporation, Chu-Nan (TW)

( * ) Notice: Subject to any disclaimer, the term of this patent is extended or adjusted under 35 U.S.C. 154(b) by 560 days.

(21) Appl. No.: 12/566,538

(22) Filed: Sep. 24, 2009

(65) Prior Publication Data

US 2010/0073325 A1    Mar. 25, 2010

(30) Foreign Application Priority Data

Sep. 25, 2008    (TW) ............................... 97136918 A (51) Int. Cl.
G06F 3/045    (2006.01)
G06F 3/041    (2006.01)

(52) U.S. Cl. ................ 345/174; 345/173; 178/18.01; 178/18.06

(58) Field of Classification Search ............ None
See application file for complete search history.

(56) References Cited

U.S. PATENT DOCUMENTS

| | | | |
|---|---|---|---|
| 5,914,465 | A | 6/1999 | Allen et al. |
| 7,230,609 | B2 | 6/2007 | Chao et al. |
| 7,312,070 | B2 | 12/2007 | Lo et al. |
| 7,385,594 | B2 | 6/2008 | Liao et al. |
| 2005/0200597 | A1 | 9/2005 | Peng et al. |
| 2009/0167725 | A1* | 7/2009 | Lee et al. ................ 345/178 |

FOREIGN PATENT DOCUMENTS

TW    I253590    4/2006
TW    I257070    6/2006

* cited by examiner

*Primary Examiner* — Andrew L Sniezek
(74) *Attorney, Agent, or Firm* — Liu & Liu (57) ABSTRACT

An object position detecting device includes a touch film, a first electrode set, a second electrode set, and a sensing and computing circuit. An object position detecting method includes the following steps. Firstly, an object is provided on the touch film. Then, first equivalent capacitance values of multiple first electrode groups of a first electrode set under the touch film are sensed, wherein each first electrode group includes n adjacent first electrodes that are parallel with and connected with each other. Then, second equivalent capacitance values of multiple second electrode groups of a second electrode set under the touch film are sensed, wherein each second electrode group includes m adjacent second electrodes that are parallel with and connected with each other. According to the first equivalent capacitance values and the second equivalent capacitance values, first position information of the object is calculated.

12 Claims, 11 Drawing Sheets

DEVICE AND METHOD FOR DETECTING POSITION OF OBJECT AND IMAGE DISPLAY SYSTEM HAVING SUCH DEVICE

FIELD OF THE INVENTION

The present invention relates to an object position detecting device and an object position detecting method. The present invention also relates to an image display system having such an object position detecting device.

BACKGROUND OF THE INVENTION

Figure 1:
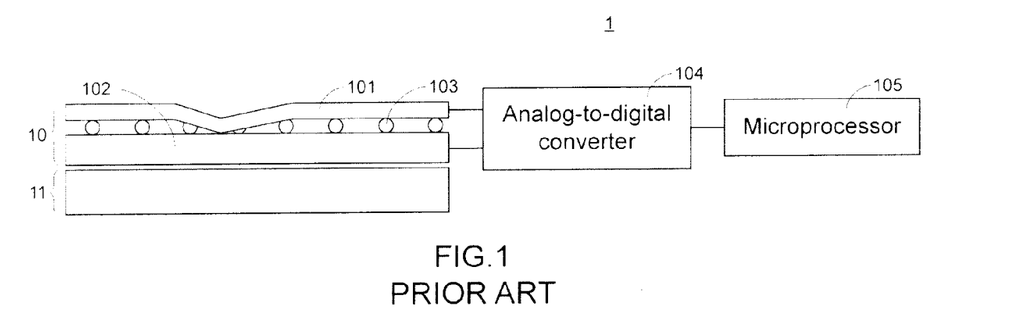
FIG. 1 is a schematic cross-sectional view illustrating a touch panel display module according to the prior art.

As the volume of portable electronic device is gradually reduced, a touch panel display module having an input function and a display function is widely used in the small-sized portable electronic device such as a mobile phone, a personal digital assistant (PDA), a smart phone and the like. FIG. 1 is a schematic cross-sectional view illustrating a touch panel display module according to the prior art. As shown in FIG. 1, the touch panel display module 1 principally comprises a transparent touch panel 10 and a flat display 11. The touch panel 10 is a resistive touch panel. The touch panel 10 comprises a layer of transparent conductive film 101 and a layer of transparent conductive substrate 102. There is a constant voltage difference between the transparent conductive film 101 and the transparent conductive substrate 102. In addition, many spacer dots 103 are interposed between the transparent conductive film 101 and the transparent conductive substrate 102 for isolation between these two layers. When a finger or stylus touches the touch panel display module 1, the transparent conductive film 101 (top layer) is deformed and contacted with the transparent conductive substrate 102 (bottom layer). As such, two analog voltage values indicative of the touched position is transmitted to an analog-to-digital converter 104. The analog voltage values are converted into digital signals by the analog-to-digital converter 104. The digital signals are transmitted to a back-end microprocessor 105. The digital signals are processed by the back-end microprocessor 105, thereby obtaining the coordinate values (X, Y) of the touched position.

The resistive touch panel, however, has some drawbacks. For example, if the transparent conductive film 101 is seriously scratched, the resistive touch panel 10 is possibly subject to a broken circuit and thus the resistive touch panel 10 fails to be normally operated. Moreover, the resistive touch panel has inferior optical properties and low touch sensitivity.

Figure 2A:
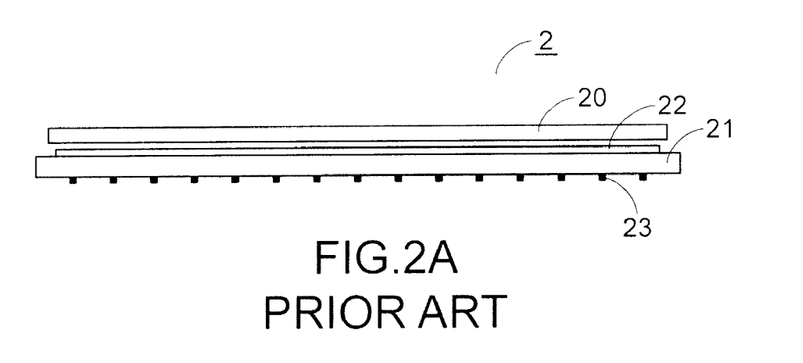
FIGS. 2A and 2B are schematic views illustrating a conventional capacitive touch panel.
Figure 2B:
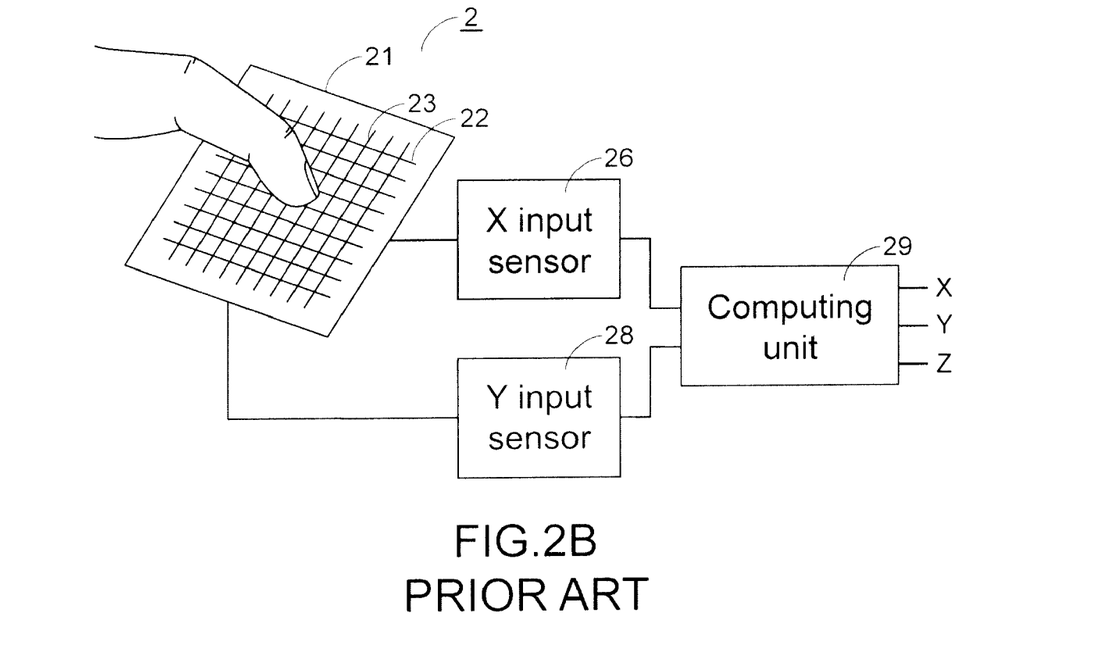

For solving the drawbacks encountered from the resistive touch panel, a capacitive touch panel has been proposed and widely used in various electronic devices. FIGS. 2A and 2B are schematic views illustrating a conventional capacitive touch panel. A first set of transparent electrodes 22 and a second set of transparent electrodes 23 are disposed on a substrate 21 and orthogonal to each other. The capacitance values of the transparent electrodes 22 and 23 are periodically detected by an X input sensor 26 and a Y input sensor 28. When a finger or stylus touches the capacitive touch panel 2, the capacitance value sensed by the X input sensor 26 and the Y input sensor 28 is changed. The sensed capacitance values indicative of the touched position are transmitted to the computing unit 29, thereby obtaining the coordinate values (X, Y) and the pressure level Z of the finger on the touched position. For increasing the scratch resistance of the capacitive touch panel 2, a silicon dioxide insulating layer 20 is usually disposed on the external surface of the capacitive touch panel 2. The related contents of the capacitive touch panel are disclosed in for example U.S. Pat. No. 5,914,465.

Generally, the conventional capacitive touch panel 2 only responds to finger contact but does not work with a stylus because the contact point of the stylus is much smaller than that of the human finger. For detecting the position of the contact point of the stylus, the transparent electrodes 22 and 23 in the orthogonal arrangement should be closely spaced. Under this circumstance, the capacitive touch panel 2 needs to have more pins to be connected to the X input sensor 26 and the Y input sensor 28. As the number of pins is increased, the space for accommodating the pins is increased, the fabricating cost is increased and the sensing time period is extended. Moreover, even if the capacitive touch panel 2 is designed to only respond to finger contact, the capacitive touch panel 2 is not aesthetically pleasing because the transparent electrodes 22 and 23 in the orthogonal arrangement are relatively far spaced. In other words, if the distance between the adjacent electrodes 22 and 23 is too long, the image quality is deteriorated.

Therefore, there is a need of providing an improved object position detecting device so as to obviate the drawbacks encountered from the prior art.

SUMMARY OF THE INVENTION

In accordance with an aspect, the present invention provides an object position detecting device for detecting a position of an object. The object position detecting device includes a touch film, a first electrode set, a second electrode set, and a sensing and computing circuit. The first electrode set is disposed under the touch film and includes multiple first electrodes that are parallel with each other and run in a first direction. At least one of the first electrodes is subject to a capacitance change when the object approaches the touch film. The first electrodes of the first electrode set are divided into multiple first electrode groups. Each first electrode group includes n adjacent first electrodes that are parallel with and connected with each other, in which n is an integer and n>1. The second electrode set is disposed under the touch film and includes multiple second electrodes that are parallel with each other and run in a second direction. At least one of the second electrodes is subject to a capacitance change when the object approaches the touch film. The second electrodes of the second electrode set are divided into multiple second electrode groups. Each second electrode group includes m adjacent second electrodes that are parallel with and connected with each other, in which m is an integer and m>1. The sensing and computing circuit is electrically connected to the first electrode set and the second electrode set for sensing first equivalent capacitance values of the first electrode groups and second equivalent capacitance values of the second electrode groups, and calculating first position information of the object according to the first equivalent capacitance values and the second equivalent capacitance values.

In accordance with another aspect, the present invention provides an object position detecting method for use with an object position detecting device. The object position detecting device includes a touch film, a first electrode set and a second electrode set. The object position detecting method includes the following steps. Firstly, first equivalent capacitance values of multiple first electrode groups of a first electrode set under the touch film are sensed when an object is provided on the touch film, wherein each first electrode group includes n adjacent first electrodes that are parallel with and connected with each other, in which n is an integer and n>1. Then, second equivalent capacitance values of multiple second electrode groups of a second electrode set under the touch film are sensed, wherein each second electrode group includes m adjacent second electrodes that are parallel with and connected with each other, in which m is an integer and m>1. According to the first equivalent capacitance values and the second equivalent capacitance values, first position information of the object is calculated.

In an embodiment, the object position detecting method further includes the following steps. Next, third equivalent capacitance values of multiple third electrode groups of the first electrode set under the touch film are sensed, wherein each third electrode group includes first electrodes having the same ordinal position of every first electrode group. Next, fourth equivalent capacitance values of multiple fourth electrode groups of the second electrode set under the touch film are sensed, wherein each fourth electrode group includes second electrodes having the same ordinal position of every second electrode group. According to the third equivalent capacitance values and the fourth equivalent capacitance values, second position information of the object is calculated. According to the first position information and the second position information, third position information of the object is calculated.

In accordance with a further aspect, the present invention provides an image display system. The image display system includes a display device and a power supply. The display device has an object position detecting device of the present invention. The power supply is electrically connected to the display device for providing electric energy to power the display device.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 3:
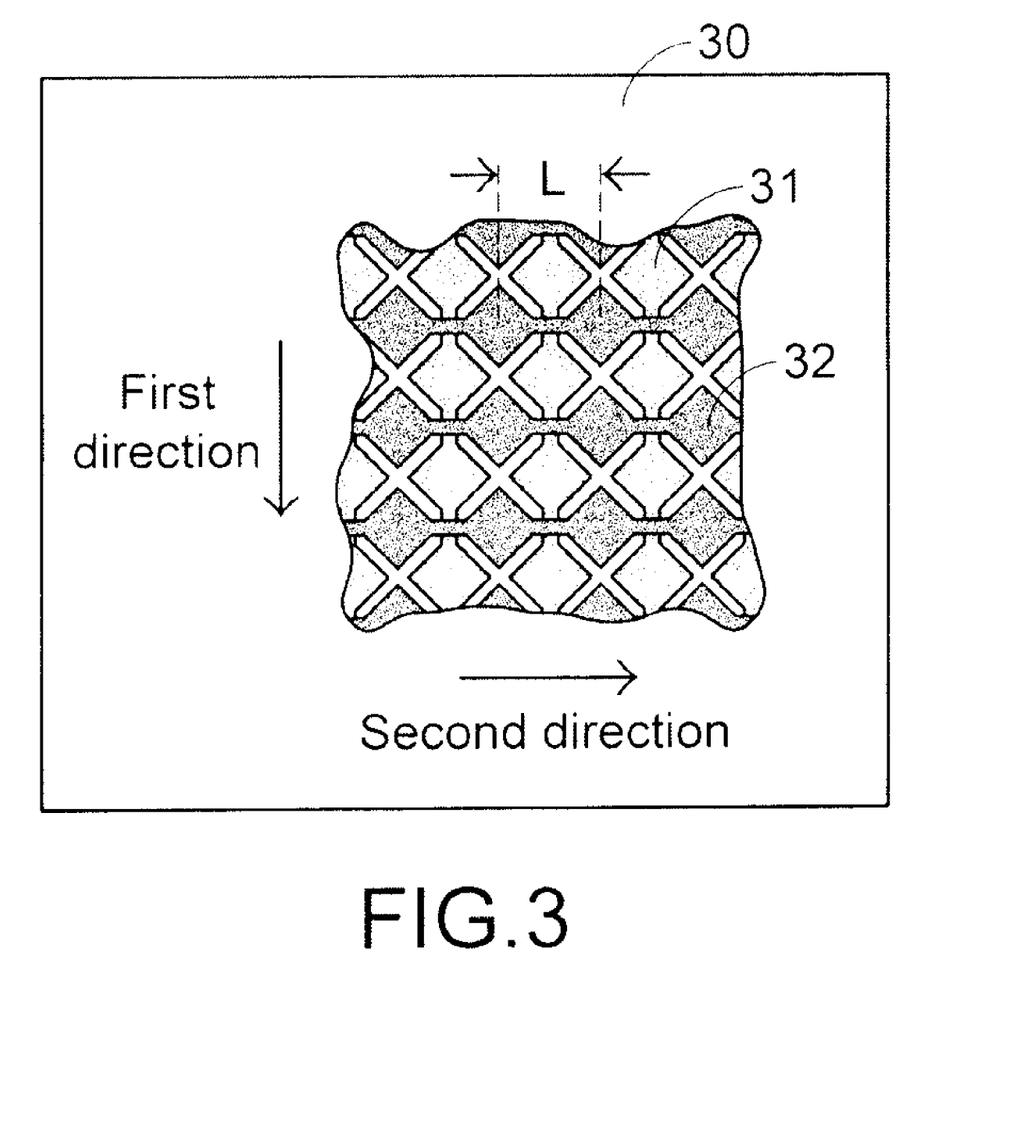
FIG. 3 is a schematic top perspective view illustrating a capacitive touch panel according to an embodiment of the present invention.

FIG. 3 is a schematic top perspective view illustrating a capacitive touch panel according to an embodiment of the present invention. As shown in FIG. 3, a first electrode set and a second electrode set are disposed under a touch film 30. The first electrode set includes multiple first electrodes 31, which are parallel with each other and run in a first direction. The second electrode set includes multiple second electrodes 32, which are parallel with each other and run in a second direction. When an object approaches any one of the first electrodes 31 and the second electrodes 32, the capacitance value is changed. In accordance with a key feature of the present invention, the sum of the width of a first electrode 31 and the gap between two adjacent first electrodes 31 is ranged from 0.5 mm to 2 mm. Similarly, the sum of the width of a second electrode 32 and the gap between two adjacent second electrodes 32 is ranged from 0.5 mm to 2 mm. Since the transparent electrodes 31 and 32 in the orthogonal arrangement are more closely spaced, the capacitive touch panel of the present invention becomes aesthetically pleasing. Moreover, since the transparent electrodes 31 and 32 are highly concentrated, the capacitive touch panel of the present invention is feasible for sensing a small-area object (e.g. a stylus). Moreover, the pin number of the capacitive touch panel of the present invention is less than that of the conventional capacitive touch panel, which will be illustrated later.

Figure 4A:
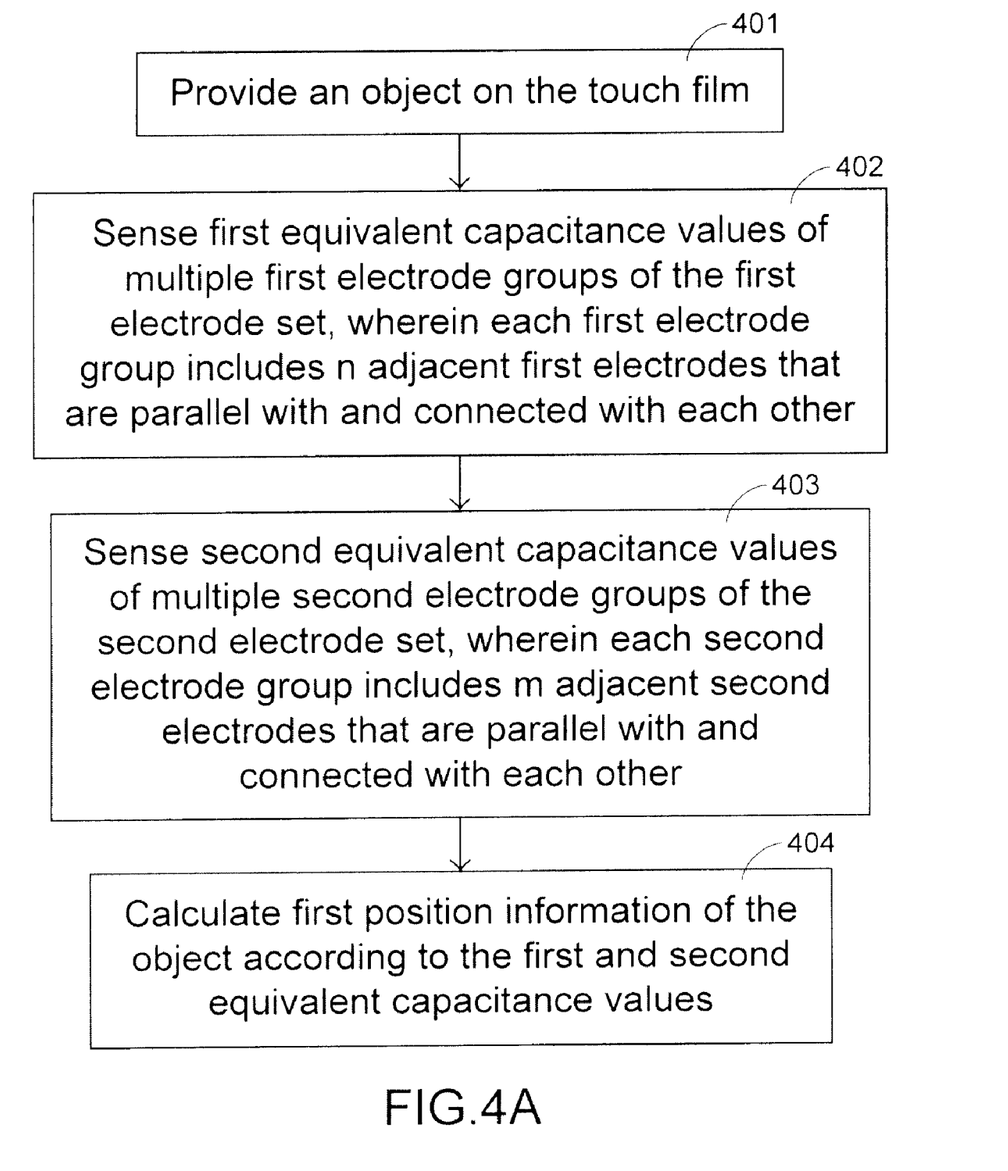
FIG. 4A is a flowchart illustrating an object position detecting method of the present invention according to an embodiment of the present invention.

FIG. 4A is a flowchart illustrating an object position detecting method of the present invention according to an embodiment of the present invention. The object position detecting method can be applied to the capacitive touch panel of the present invention. First of all, an object (e.g. a finger) is provided on the touch film 30 (Step 401). The first electrodes of the first electrode set are divided into multiple first electrode groups. Each first electrode group of the first electrode set includes n adjacent first electrodes that are parallel with and connected with each other. Next, the first equivalent capacitance values of all first electrode groups are sensed (Step 402). In addition, the second electrodes of the second electrode set are divided into multiple second electrode groups. Each group of the second electrode set includes m adjacent second electrodes that are parallel with and connected with each other. Next, the second equivalent capacitance values of all second electrode groups are sensed (Step 403). In this embodiment, n and m are integers, n>1, and m>1. Afterwards, first position information of the object on the coordinate system of the touch film 30 is calculated according to the first and second equivalent capacitance values (Step 404).

Figure 4B:
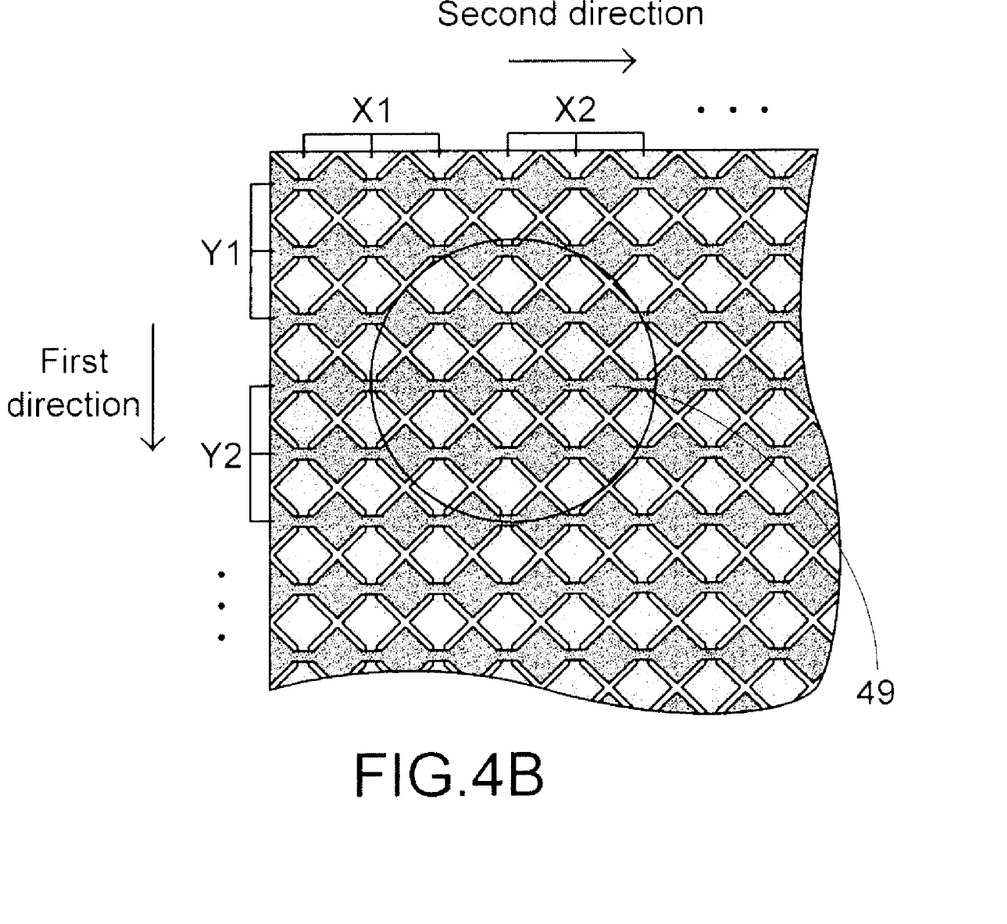
FIG. 4B is a schematic view illustrating an exemplary object position detecting device of the present invention.

FIG. 4B is a schematic view illustrating an exemplary object position detecting device of the present invention. In this embodiment, n=m=3. Depending on the electrode width, the gap between adjacent electrodes and the finger contact area, the values n and m are varied. Each first electrode group of the first electrode set includes three adjacent first electrodes that are parallel with and connected with each other.

The first electrode groups of the first electrode set are successively denoted as X1, X2, . . . , and so on. Similarly, each second electrode group of the second electrode set includes three adjacent second electrodes that are parallel with and connected with each other. The second electrode groups of the second electrode set are successively denoted as Y1, Y2, . . . , and so on. The equivalent capacitance values of the electrode groups X1, X2, Y1, Y2, . . . , are successively detected. Under this circumstances, a 3×3 block is a unit contact region for sensing the coordinate values of the finger 49 on the touch film 30.

Figure 4C:
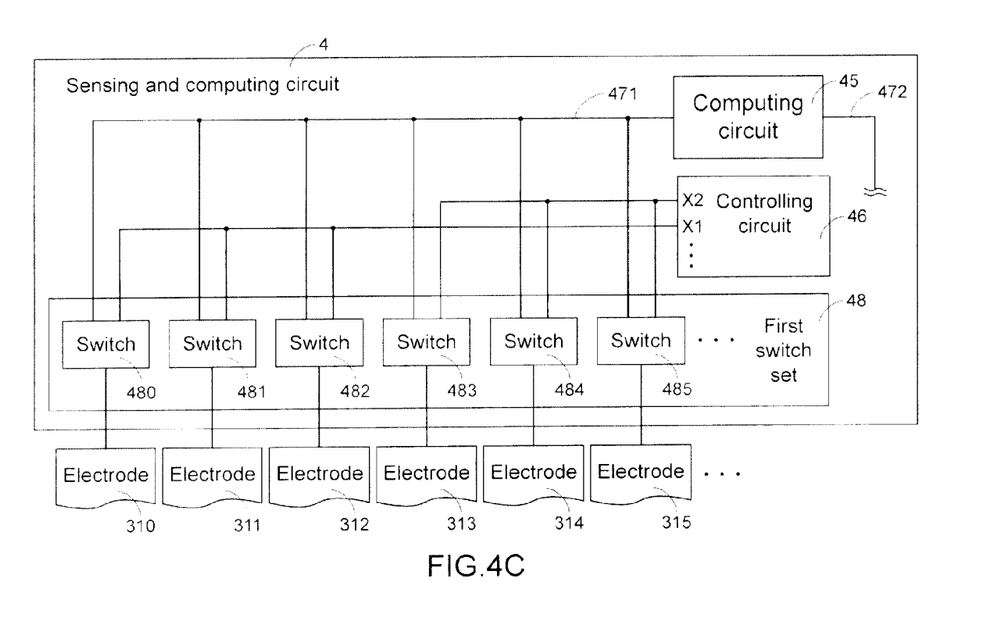
FIG. 4C is a schematic circuit block diagram illustrating an exemplary sensing and computing circuit for processing the equivalent capacitance values of the first and second electrode groups.

FIG. 4C is a schematic circuit block diagram illustrating an exemplary sensing and computing circuit for processing the equivalent capacitance values of the first and second electrode groups. As shown in FIG. 4C, the sensing and computing circuit 4 comprises a computing circuit 45 and an electrode switching and controlling module. The electrode switching and controlling module includes a first switch set 48, a second switch set and a controlling circuit 46. For clarification and brevity, only some first electrodes 310~315 of the first electrode set are shown in the drawings. Corresponding to the first electrodes 310~315 of the first electrode set, the first switch set 48 includes the same number of switches 480~485. For each of the switches 480~485, a first terminal is electrically connected to a corresponding electrode; a second terminal is collectively connected to a first sensing line 471; and a control terminal is connected to the controlling circuit 46. Under control of the controlling circuit 46, the first terminal and the second terminal of each switch are connected with or disconnected from each other, so that the switch is conducted (an on status) or shut off (an off status).

In this embodiment, three adjacent switches corresponding to the same first electrode group are simultaneously conducted. For example, when the three switches 480, 481 and 482 are simultaneously conducted, the three adjacent first electrodes 310, 311 and 312 of the first electrode set are electrically connected with the first sensing line 471, and thus a first equivalent capacitance value is generated. Similarly, when three switches of the second switch set (not shown) are conducted, three adjacent second electrodes of the second electrode set are electrically connected with the second sensing line 472, and thus a second equivalent capacitance value is generated. Accordingly, multiple first equivalent capacitance values and multiple second equivalent capacitance values are successively generated. The connection between the second electrode set and the second switch set is similar to the connection between the first electrode set and the first switch set, and is not redundantly described herein. The first equivalent capacitance values and the second equivalent capacitance values are transmitted to the computing circuit 45 through the first sensing line 471 and the second sensing line 472, respectively. According to the first equivalent capacitance value and the second equivalent capacitance value, the computing circuit 45 calculates position information of the object (e.g. the finger 49) on the XY-coordinate system of the touch film 30. Since the electrode width is very thin, the capacitive touch panel of the present invention is aesthetically pleasing.

Figure 5A:
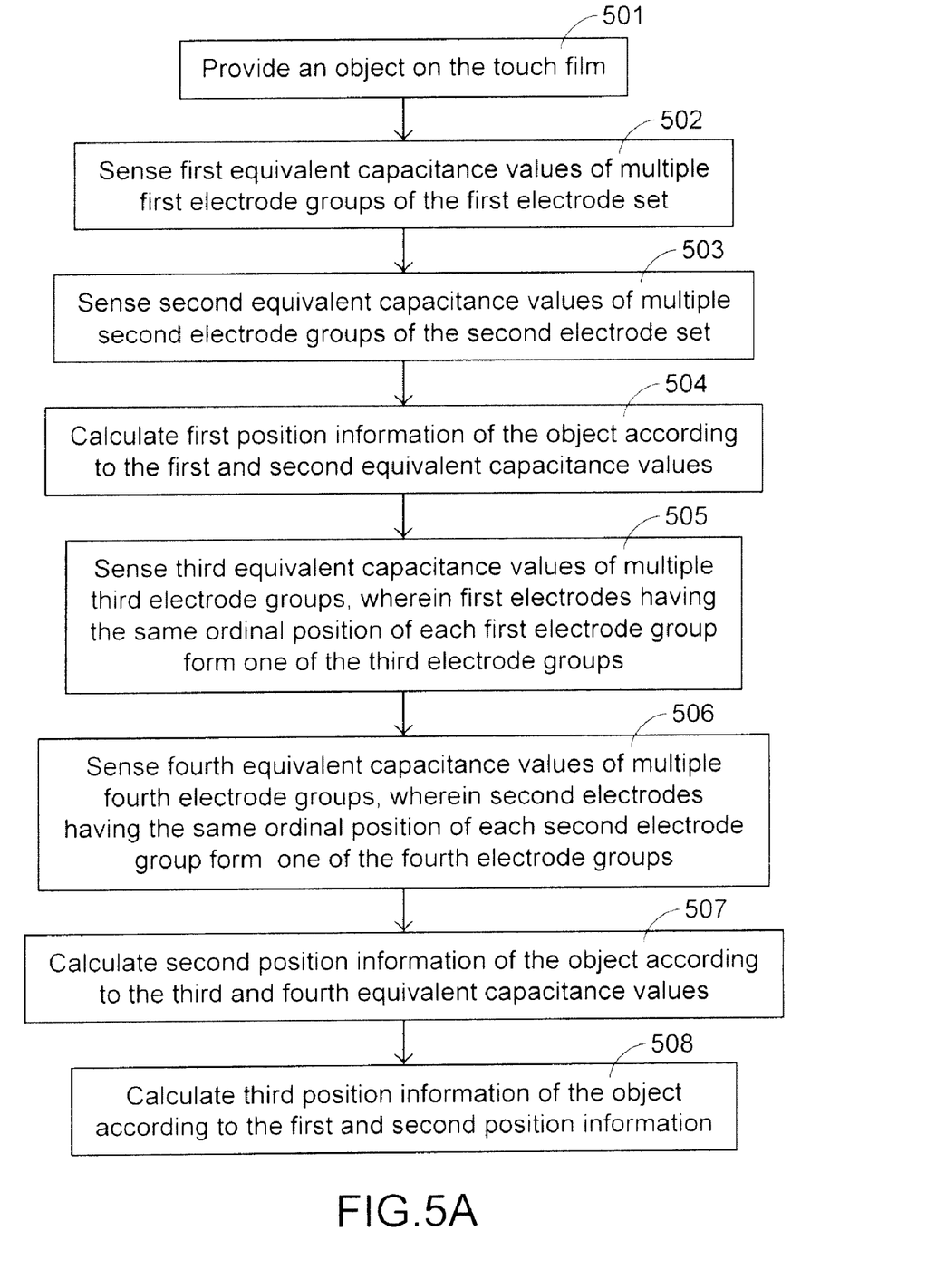
FIG. 5A is a flowchart illustrating an object position detecting method of the present invention according to another embodiment of the present invention.

For precisely sensing the touching position of a stylus, another object position detecting method will be illustrated with reference to FIGS. 5A, 5B, 5C and 5D. FIG. 5A is a flowchart illustrating an object position detecting method of the present invention according to another embodiment of the present invention. First of all, an object (e.g. a stylus) is provided on the touch film 30 (Step 501). The first electrodes of the first electrode set are divided into multiple first electrode groups. Each first electrode group of the first electrode set includes n adjacent first electrodes that are parallel with and connected with each other. Next, the first equivalent capacitance values of all first electrode groups are sensed (Step 502). In addition, the second electrodes of the second electrode set are divided into multiple second electrode groups. Each second electrode group of the second electrode set includes m adjacent second electrodes that are parallel with and connected with each other. Next, the second equivalent capacitance values of all second electrode groups are sensed (Step 503). In this embodiment, n and m are integers, n>1, and m>1. Afterwards, first position information of the object on the coordinate system of the touch film 30 is calculated according to the first and second equivalent capacitance values (Step 504). Next, the first electrodes of the first electrode set under the touch film 30 are divided into multiple third electrode groups. First electrodes having the same ordinal position of every first electrode group form one of the third electrode groups. Next, the third equivalent capacitance values of all third electrode groups are sensed (Step 505). Next, the second electrodes of the second electrode set under the touch film 30 are divided into multiple fourth electrode groups. Second electrodes having the same ordinal position of every second electrode group form one of the fourth electrode groups. Next, the fourth equivalent capacitance values of all fourth electrode groups are sensed (Step 506). According to the third and fourth equivalent capacitance values, second position information of the object is calculated (Step 507). Afterwards, third position information is calculated according to the first position information and the second position information (Step 508).

Figure 5B:
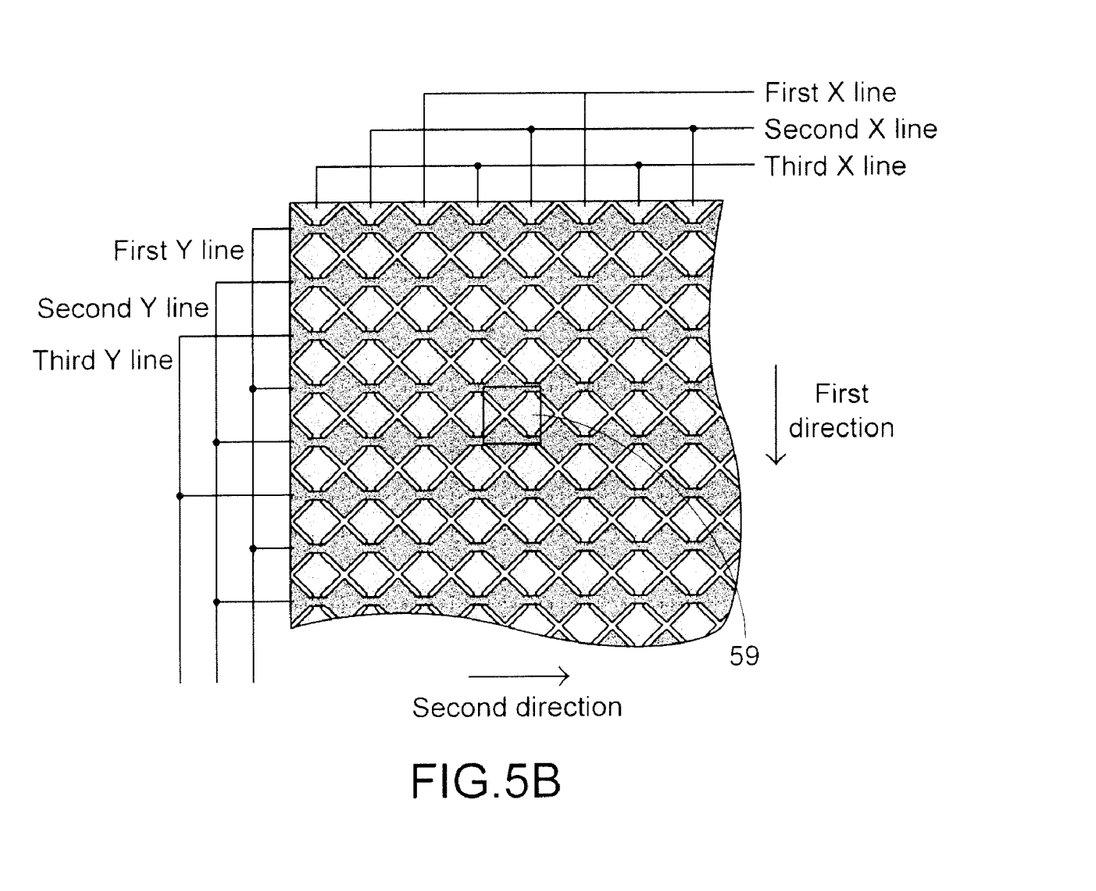
FIG. 5B is a schematic view illustrating another exemplary object position detecting device of the present invention.

FIG. 5B is a schematic view illustrating another exemplary object position detecting device of the present invention. In this embodiment, n=m=3. The first electrodes of the first electrode set are divided into multiple third electrode groups. Each third electrode group includes first electrodes having the same ordinal position of every first electrode group. As shown in FIG. 5B, the first one of the three first electrodes of every first electrode group is connected to a first X line in parallel; the second one of the three first electrodes of every first electrode group is connected to a second X line in parallel; and the third one of the three first electrodes of every first electrode group is connected to a third X line in parallel. The third equivalent capacitance values of the first, second and third X lines are respectively sensed. Similarly, the second electrodes of the second electrode set are divided into multiple fourth electrode groups. Each fourth electrode group includes first electrodes having the same ordinal position of every second electrode group. As shown in FIG. 5B, the first one of the three second electrodes of every second electrode group is connected to a first Y line in parallel; the second one of the three second electrodes of every second electrode group is connected to a second Y line in parallel; and the third one of the three second electrodes of every second electrode group is connected to a third Y line in parallel. The fourth equivalent capacitance values of the first, second and third Y lines are respectively sensed. Next, second position information of the object on the coordinate system of the touch film 30 is obtained according to the third and fourth equivalent capacitance values. Afterwards, an intersection operation is performed on the first position information and the second position information, thereby obtaining third position information. As shown in FIG. 5B, the third position information indicates the coordinate value of the stylus 59 on the touch film 30.

Take n=m=3 for example. The first position information obtained in Step 504 indicates a specified 3×3 block on the touch film 30. The second position information obtained in Step 507 indicates a specified position of the 3×3 block. The third position information obtained in Step 508 indicates a precise coordinate value of the stylus 59 on the touch film 30, wherein the third position information is a result of performing an intersection operation on the first position information and the second position information. The sequence of obtaining the first position information and the second position information may be exchanged without influencing the accuracy of the third position information. In some embodiments, n is not equal to m.

In accordance with another key feature of the present invention, the total capacitance value of the first, second, third and fourth equivalent capacitance values may be used to determine whether the object on the touch film is a large-area object or a small-area object.

For example, the first and second equivalent capacitance values may be firstly obtained by sensing a broader region. If the total capacitance value of the first and second equivalent capacitance values is greater than a first threshold value when the touch film is touched by the object, the object is deemed as the large-area object (e.g. a finger). Whereas, if the total capacitance value of the first and second equivalent capacitance values is less than the first threshold value when the touch film is touched by the object, the object is deemed as the small-area object (e.g. a stylus). In other words, before the first position information is obtained, the object position detecting method of the present invention further includes a step of determining whether the object is a large-area object or a small-area object. If the object is deemed as the large-area object, the first position information indicates a touched position of the large-area object on the touch film. Under this circumstance, the further steps of obtaining the second position information may be omitted. On the other hand, if the object is deemed as the small-area object, the second position information needs to be calculated after the first position information is obtained. Under this circumstance, the third position information obtained by performing an intersection operation on the first position information and the second position information indicates a touched position of the small-area object on the touch film.

Moreover, the third and fourth equivalent capacitance values may be firstly obtained by sensing a narrower region. If the total capacitance value of the third and fourth equivalent capacitance values is greater than a second threshold value when the touch film is touched by the object, the object is deemed as the large-area object (e.g. a finger). Whereas, if the total capacitance value of the third and fourth equivalent capacitance values is less than the second threshold value when the touch film is touched by the object, the object is deemed as the small-area object (e.g. a stylus). In other words, after the second position information is obtained, the object position detecting method of the present invention further includes a step of determining whether the object is a large-area object or a small-area object. Regardless of whether the object is a large-area object or a small-area object, the first position information needs to be further calculated after the second position information is obtained. If the object is deemed as the large-area object, the first position information indicates a touched position of the large-area object on the touch film. If the object is deem as the small-area object, the third position information obtained by performing an intersection operation on the first position information and the second position information indicates a touched position of the small-area object on the touch film.

Figure 5C:
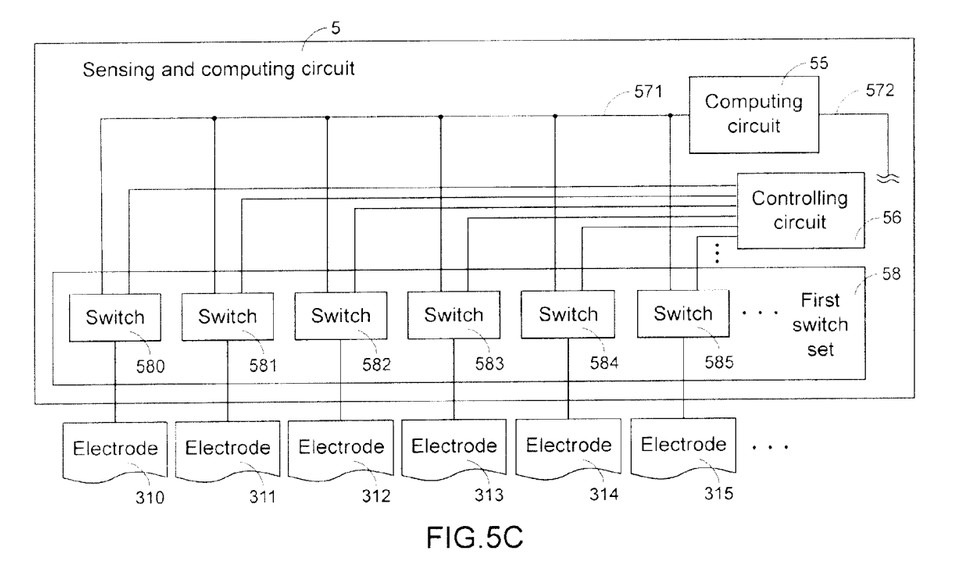
FIG. 5C is a schematic circuit block diagram illustrating another exemplary sensing and computing circuit for processing the equivalent capacitance values.

FIG. 5C is a schematic circuit block diagram illustrating another exemplary sensing and computing circuit for processing the equivalent capacitance values. As shown in FIG. 5C, the sensing and computing circuit 5 comprises a computing circuit 55 and an electrode switching and controlling module. The electrode switching and controlling module includes a first switch set 58, a second switch set and a controlling circuit 56. For clarification and brevity, only some first electrodes 310~315 of the first electrode set are shown in the drawings. Corresponding to the first electrodes 310~315 of the first electrode set, the first switch set 58 includes the same number of switches 580~585. For each of the switches 580~585, a first terminal is electrically connected to a corresponding electrode; a second terminal is collectively connected to a first sensing line 571; and a control terminal is connected to the controlling circuit 56. Under control of the controlling circuit 56, the first terminal and the second terminal of each switch are connected with or disconnected from each other, so that the switch is conducted (an on status) or shut off (an off status).

In a first operating mode, three adjacent switches in each first electrode group are simultaneously conducted under control of the controlling circuit 56. For example, when the three switches 580, 581 and 582 are simultaneously conducted, the three adjacent first electrodes 310, 311 and 312 of the first electrode set are electrically connected with the first sensing line 571, and thus a first equivalent capacitance value is generated. Similarly, when three switches of the second switch set (not shown) are conducted, three adjacent second electrodes of the second electrode set are electrically connected with the second sensing line 572, and thus a second equivalent capacitance value is generated. The connection between the second electrode set and the second switch set is similar to the connection between the first electrode set and the first switch set, and is not redundantly described herein. Next, the first equivalent capacitance values and the second equivalent capacitance values are successively transmitted to the computing circuit 55 through the first sensing line 571 and the second sensing line 572, respectively. According to the first equivalent capacitance values and the second equivalent capacitance values, the computing circuit 55 calculates first position information of the object on the XY-coordinate system of the touch film 30. In this embodiment, the first position information is a 3×3 block. Alternatively, under control of the controlling circuit 56, the first position information may be adjusted as a 2×2 block or a 4×4 block.

In a second operating mode, switches corresponding to respective third electrode groups are simultaneously conducted under control of the controlling circuit 56. For example, when the switches 580 and 583 are simultaneously conducted, the first one of the three first electrodes of every first electrode group (i.e. the first electrodes 310 and 313) is electrically connected with the first sensing line 571, and thus a third equivalent capacitance value is generated. Similarly, when the switches 581 and 584 are simultaneously conducted, the first electrodes 311 and 314 are electrically connected with the first sensing line 571, and thus another third equivalent capacitance value is generated. Similarly, when the switches 582 and 585 are simultaneously conducted, the first electrodes 312 and 315 are electrically connected with the first sensing line 571, and thus a further third equivalent capacitance value is generated. Similarly, when switches (not shown) corresponding to the respective fourth electrode groups are simultaneously conducted, the corresponding second electrodes are electrically connected with the second sensing line 572 and thus a fourth equivalent capacitance value is generated. The operation principle of generating multiple fourth equivalent capacitance values are similar to those of generating multiple third equivalent capacitance values, and are not redundantly described herein. Next, the third equivalent capacitance values and the fourth equivalent capacitance values are successively transmitted to the computing circuit 55 through the first sensing line 571 and the second sensing line 572, respectively. According to the third equivalent capacitance values and the fourth equivalent capacitance values, the computing circuit 55 calculates second position information of the object on the XY-coordinate system of the touch film 30. Afterwards, the computing circuit 55 performs an intersection operation on the first position information and the second position information, thereby obtaining third position information. The third position information indicates a touched position of a small-area object (e.g. a stylus) on the touch film 30.

Figure 5D:
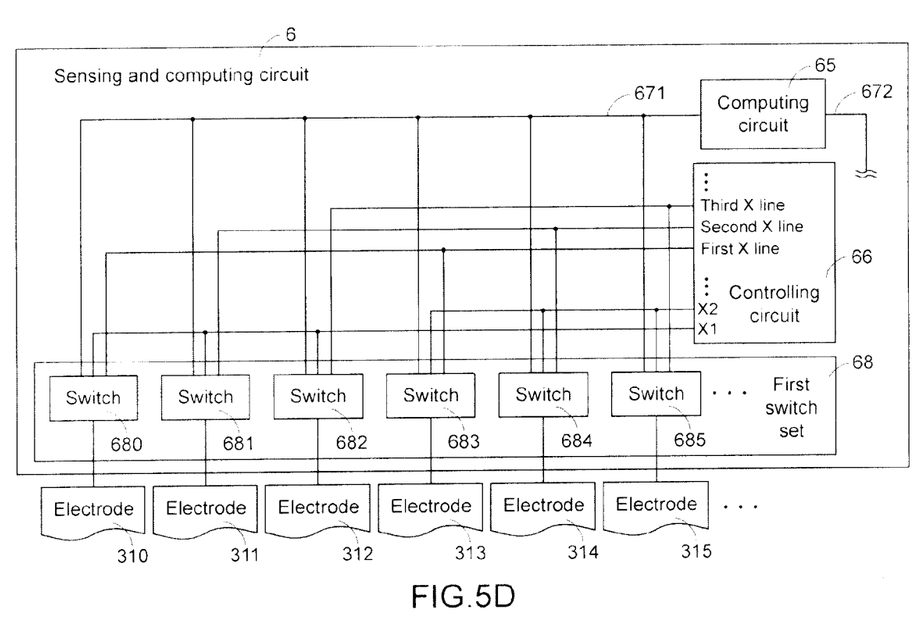
FIG. 5D is a schematic circuit block diagram illustrating a further exemplary sensing and computing circuit for processing the equivalent capacitance values.

FIG. 5D is a schematic circuit block diagram illustrating a further exemplary sensing and computing circuit for processing the equivalent capacitance values. As shown in FIG. 5D, the sensing and computing circuit 6 comprises a computing circuit 65 and an electrode switching and controlling module. The electrode switching and controlling module includes a first switch set 68, a second switch set and a controlling circuit 66. For clarification and brevity, only some first electrodes 310~315 of the first electrode set are shown in the drawings. Corresponding to the first electrodes 310~315 of the first electrode set, the first switch set 68 includes the same number of switches 680~685. For each of the switches 680~685, a first terminal is electrically connected to a corresponding electrode; and a second terminal is collectively connected to a first sensing line 671. Under control of the controlling circuit 66, the first terminal and the second terminal of each switch are connected with or disconnected from each other, so that the switch is conducted (an on status) or shut off (an off status).

The operations of the switches of the sensing and computing circuit 6 in the first and second operating modes are similar to those of the switches shown in FIG. 5C, and are not redundantly described herein. In comparison with the sensing and computing circuit 5 of FIG. 5C, the wire connecting mechanism between the controlling circuit 66 and the first switch set 68 and the second switch set of the sensing and computing circuit 6 are distinguished. The connection between the second electrode set and the second switch set is similar to the connection between the first electrode set and the first switch set, and is not redundantly described herein. As shown in FIG. 5D, the output pins of the controlling circuit 66 include first-portion pins and second-portion pins. The first-portion pins X1, X2, . . . are connected to the control terminals of corresponding switches of the first switch set 68, thereby controlling on/off statuses of the switches in the first operating mode. The first-portion pins Y1, Y2, . . . (not shown) are connected to the control terminals of corresponding switches of the second switch set, thereby controlling on/off statuses of the switches in the first operating mode. The second-portion pins of the first X line, the second X line, the third X line are connected to the control terminals of corresponding switches of the first switch set 68, thereby controlling on/off statuses of the switches in the second operating mode. The second-portion pins of the first Y line, the second Y line, the third Y line (not shown) are connected to the control terminals of corresponding switches of the second switch set, thereby controlling on/off statuses of the switches in the second operating mode. In comparison with the sensing and computing circuit 5 of FIG. 5C, the sensing and computing circuit 6 needs less number of pins. The connection between the first sensing line 671, the second sensing line 672 and the computing circuit 65 is similar to that of FIG. 5C, and is not redundantly described herein.

In the above embodiments, the sensing and computing circuit (4, 5 or 6), the first switch set (48, 58 or 68), the switches (480~485, 580~585 or 680~685), the controlling circuit (46, 56 or 66), and the computing circuit (45, 55 or 65) may be included in an integrated circuit chip according to a semiconductor fabricating process. In addition, the first electrodes and the second electrodes are made of transparent conductive material or other conductive material, the touch film is made of insulating material, and the first direction and the second direction are orthogonal to each other.

Figure 6:
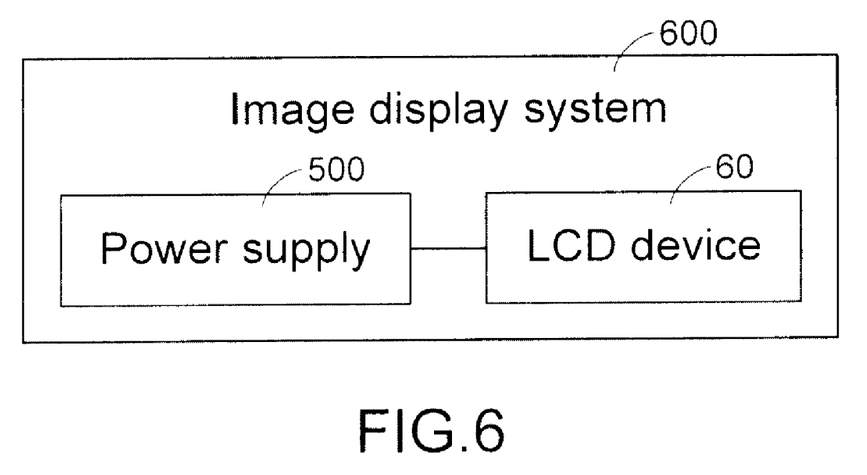
FIG. 6 is a schematic functional circuit block diagram illustrating an image display system according to the present invention.

FIG. 6 is a schematic functional circuit block diagram illustrating an image display system according to the present invention. The image display system 600 comprises a LCD device 60 and a power supply 500. The capacitive touch panel as described in the FIG. 3, FIG. 4C, FIG. 5C or FIG. 5D can be integrated into the LCD device 60 so as to form a touch screen display. The power supply apparatus 500 is electrically connected to the LCD device 60 for providing electric energy to the LCD device 60. An example of the image display system 600 includes but is not limited to a mobile phone, a digital camera, a personal digital assistant, a notebook computer, a desktop computer, a TV set, a global positioning system (GPS), an automotive display system, a flight display system, a digital photo frame, a portable DVD player, and the like. The present invention is illustrated by referring to a LCD device. Nevertheless, the present invention is applicable to other display device such as an organic light emitting diode (OLED) device.

Figure 7:
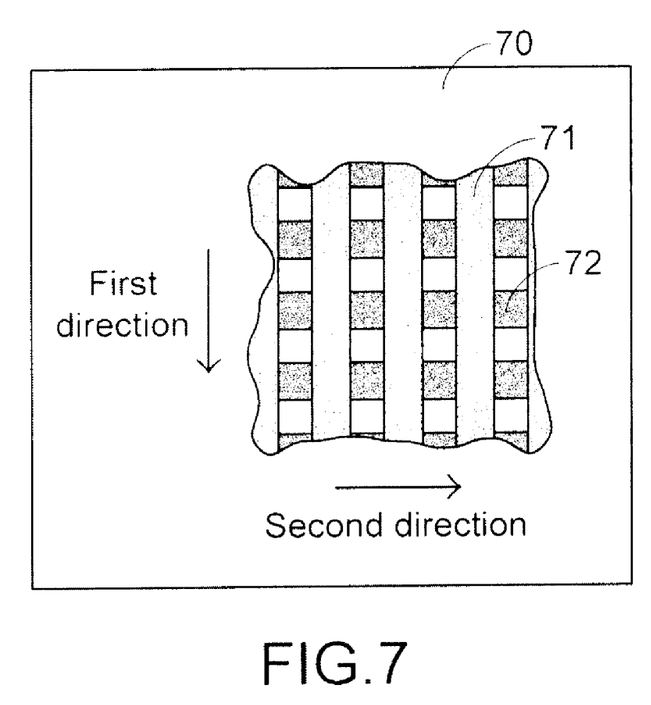
FIG. 7 is a schematic top perspective view illustrating a variant of the capacitive touch panel according to the present invention.

In the above embodiments, the first electrode and the second electrode are rhombus-shaped. It is noted that the first electrode and the second electrode may have other shapes. FIG. 7 is a schematic top perspective view illustrating a variant of the capacitive touch panel according to the present invention. As shown in FIG. 7, the first electrode 71 and the second electrode 72 are strip-shaped.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An object position detecting device for detecting a position of an object, the object position detecting device comprising:
 a touch film;
 a first electrode set disposed under the touch film and including multiple first electrodes that are parallel with each other and run in a first direction, wherein at least one of the first electrodes is subject to a capacitance change when the object approaches the touch film, the first electrodes of the first electrode set are divided into multiple first electrode groups, and each first electrode group includes more than one of the first electrodes that are parallel with and connected with each other;
 a second electrode set disposed under the touch film and including multiple second electrodes that are parallel with each other and run in a second direction, wherein at least one of the second electrodes is subject to a capacitance change when the object approaches the touch film, the second electrodes of the second electrode set are divided into multiple second electrode groups, and each second electrode group includes more than one of the second electrodes that are parallel with and connected with each other; and a sensing and computing circuit sensing first equivalent capacitance values of the first electrode groups and second equivalent capacitance values of the second electrode groups, wherein the sensing and computing circuit comprises:

an electrode switching and controlling module electrically connected to the first electrode set and the second electrode set, successively connecting the first electrodes of the first electrode groups in parallel so as to output the first equivalent capacitance values through a first sensing line, and successively connecting the second electrodes of the second electrode groups in parallel so as to output the second equivalent capacitance values through a second sensing line; and a computing circuit electrically connected to the first sensing line and the second sensing line, calculating the position information of the object on the touch film according to the first equivalent capacitance values and the second equivalent capacitance values that are respectively outputted through the first sensing line and the second sensing line.

2. The object position detecting device according to claim 1 wherein the first electrodes and the second electrodes are made of transparent conductive material or other conductive material, the touch film is made of insulating material, and the first direction and the second direction are orthogonal to each other.

3. The object position detecting device according to claim 1 wherein the electrode switching and controlling module includes:

a first switch set including the same number of first switches as the first electrodes of the first electrode set, wherein the first switches have first terminals respectively connected to corresponding first electrodes of the first electrode set and second terminals collectively connected to the first sensing line, and the first terminal and the second terminal of each first switch are controlled to be in either a connecting status or a disconnecting status;

a second switch set including the same number of second switches as the second electrodes of the second electrode set, wherein the second switches have first terminals respectively connected to corresponding second electrodes of the second electrode set and second terminals collectively connected to the second sensing line, and the first terminal and the second terminal of each second switch are controlled to be in either a connecting status or a disconnecting status; and a controlling circuit electrically connected to the first switch set and the second switch set, controlling the connecting or disconnecting status of the first switches and the second switches, wherein under control of the controlling circuit, the first switches corresponding to the same first electrode group are simultaneously conducted to generate a corresponding first equivalent capacitance value, and the second switches corresponding to the same second electrode group are simultaneously conducted to generate a corresponding second equivalent capacitance value.

4. The object position detecting device according to claim 1 wherein the electrode switching and controlling module includes:

a first switch set including the same number of first switches as the first electrodes of the first electrode set, wherein the first switches have first terminals respectively connected to corresponding first electrodes of the first electrode set and second terminals collectively connected to the first sensing line, and the first terminal and the second terminal of each first switch are controlled to be in either a connecting status or a disconnecting status;

a second switch set including the same number of second switches as the second electrodes of the second electrode set, wherein the second switches have first terminals respectively connected to corresponding second electrodes of the second electrode set and second terminals collectively connected to the second sensing line, and the first terminal and the second terminal of each second switch are controlled to be in either a connecting status or a disconnecting status; and a controlling circuit electrically connected to the first switch set and the second switch set, controlling the connecting or disconnecting status of the first switches and the second switches, wherein when the object position detecting device is operated in a first operating mode, under control of the controlling circuit, the first switches corresponding to the same first electrode group are simultaneously conducted to generate a corresponding first equivalent capacitance value in the first sensing line, and the second switches corresponding to the same second electrode group are simultaneously conducted to generate a corresponding second equivalent capacitance value in the second sensing line, wherein when the object position detecting device is operated in a second operating mode, under control of the controlling circuit, the first switches corresponding to the first electrodes having the same ordinal position of every first electrode group are simultaneously conducted to generate a corresponding third equivalent capacitance value in the first sensing line, and the second switches corresponding to the second electrodes having the same ordinal position of every second electrode group are simultaneously conducted to generate a corresponding fourth equivalent capacitance value in the second sensing line.

5. The object position detecting device according to claim 4 wherein the computing circuit implements steps of:

comparing a first total capacitance value of the first equivalent capacitance values and the second equivalent capacitance values with a first threshold value;

determining the object as a large-area object if the first total capacitance value is greater than the first threshold value, so that the first position information indicates a touched position of the large-area object on the touch film; and determining the object as a small-area object if the first total capacitance value is less than the first threshold value, so that third position information obtained by performing an intersection operation on the first position information and the second position information, which is calculated according to the third equivalent capacitance values and the fourth equivalent capacitance values, indicates a touched position of the small-area object on the touch film.

6. The object position detecting device according to claim 4 wherein the computing circuit further implements steps of:

comparing a second total capacitance value of the third equivalent capacitance values and the fourth equivalent capacitance values with a second threshold value;

determining the object as a small-area object if the second total capacitance value is less than the second threshold value, so that third position information obtained by performing an intersection operation on the first position information and the second position information, which is calculated according to the third equivalent capacitance values and the fourth equivalent capacitance values, indicates a touched position of the small-area object on the touch film; and determining the object as a large-area object if the second total capacitance value is greater than the second threshold value, so that the first position information indicates a touched position of the large-area object on the touch film.

7. An image display system comprising:
a display device having an object position detecting device according to claim 1; and
a power supply electrically connected to the display device, providing electric energy to power the display device.

8. The image display system according to claim 7 wherein the image display system is a mobile phone, a digital camera, a personal digital assistant, a notebook computer, a desktop computer, a TV set, a global positioning system, an automotive display system, a flight display system, a digital photo frame or a portable DVD player.

9. The image display system according to claim 7 wherein the display device is a liquid crystal display device or an organic light emitting diode device.

10. An object position detecting method for use with an object position detecting device, the object position detecting device including a touch film, a first electrode set and a second electrode set, the object position detecting method comprising steps of:

sensing first equivalent capacitance values of multiple first electrode groups of a first electrode set under the touch film when an object is provided on the touch film, wherein each first electrode group includes more than one of the first electrodes that are parallel with and connected with each other;

sensing second equivalent capacitance values of multiple second electrode groups of a second electrode set under the touch film, wherein each second electrode group includes more than one of the second electrodes that are parallel with and connected with each other;

calculating first position information of the object according to the first equivalent capacitance values and the second equivalent capacitance values;

sensing third equivalent capacitance values of multiple third electrode groups of the first electrode set under the touch film, wherein each third electrode group includes first electrodes having the same ordinal position of every first electrode group;

sensing fourth equivalent capacitance values of multiple fourth electrode groups of the second electrode set under the touch film, wherein each fourth electrode group includes second electrodes having the same ordinal position of every second electrode group;

calculating second position information of the object according to the third equivalent capacitance values and the fourth equivalent capacitance values; and calculating third position information of the object according to the first position information and the second position information.

11. The object position detecting method according to claim 10 further comprising steps of:

comparing a first total capacitance of the first equivalent capacitance values and the second equivalent capacitance values with a first threshold value;

determining the object as a large-area object if the first total capacitance is greater than the first threshold value, so that the first position information indicates a touched position of the large-area object on the touch film; and determining the object as a small-area object if the first total capacitance is less than the first threshold value, so that third position information obtained by performing an intersection operation on the first position information and the second position information indicates a touched position of the small-area object on the touch film.

12. The object position detecting method according to claim 10 further comprising steps of:

comparing a second total capacitance value of the third equivalent capacitance values and the fourth equivalent capacitance values with a second threshold value;

determining the object as a small-area object if the second total capacitance value is less than the second threshold value, so that third position information obtained by performing an intersection operation on the first position information and the second position information indicates a touched position of the small-area object on the touch film; and determining the object as a large-area object if the second total capacitance value is greater than the second threshold value, so that the first position information indicates a touched position of the large-area object on the touch film.

* * * * *